(12) United States Patent
Cowart (10) Patent No.: US 10,689,087 B2
(45) Date of Patent: Jun. 23, 2020

(54) TUBULAR STRUCTURE AND A METHOD OF MANUFACTURING THEREOF

(71) Applicant: The Boeing Company, Chicago, IL (US)

(72) Inventor: George Stephen Cowart, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 15/226,427

(22) Filed: Aug. 2, 2016

(65) Prior Publication Data
US 2018/0036959 A1    Feb. 8, 2018

(51) Int. Cl.
*B64C 1/08* (2006.01)
*B32B 1/08* (2006.01)
(Continued)

(52) U.S. Cl.
CPC ............ *B64C 1/08* (2013.01); *B29C 33/505* (2013.01); *B29C 65/02* (2013.01); *B29C 65/48* (2013.01); *B29C 65/56* (2013.01); *B29C 66/344* (2013.01); *B29C 70/323* (2013.01); *B29C 70/326* (2013.01); *B29C 70/342* (2013.01); *B29C 70/38* (2013.01); *B32B 1/08* (2013.01); *B64C 1/06* (2013.01); *B64C 1/061* (2013.01); *B64C 1/14* (2013.01); *B64C 1/1407* (2013.01); *B64C 1/1461* (2013.01); *B29L 2023/00* (2013.01); *B29L 2031/3082* (2013.01)

(58) Field of Classification Search
CPC ....... B29C 65/48; B29C 65/56; B29C 70/326; B29C 70/38; B29L 2023/00; B29L 2031/3082; B64C 1/06; B64C 1/061; B64C 1/08; B64C 1/14; B64C 1/1407; B64C 1/1461; B32B 1/08

USPC ..................... 428/34.1, 34.7, 35.7
See application file for complete search history.

(56) References Cited

U.S. PATENT DOCUMENTS 4,086,378 A    4/1978 Kam et al.
4,230,293 A    10/1980 Hamm et al.
(Continued)

FOREIGN PATENT DOCUMENTS

DE    102007060029 A1    6/2009
EP    2 674 290 A1        12/2013

OTHER PUBLICATIONS

European Search Report issued in co-pending European Patent Application No. 17182392.5, European Patent Office, dated Jan. 3, 2018, 12 pages.
(Continued)

*Primary Examiner* — Walter Aughenbaugh
(74) *Attorney, Agent, or Firm* — McDonnell Boehnen Hulbert & Berghoff LLP (57) ABSTRACT

Methods and structures are disclosed. An example method includes: rotating a tubular mandrel about a longitudinal axis of the tubular mandrel; depositing a composite material on an inner surface of the tubular mandrel to form a composite tubular member on the inner surface of the tubular mandrel; inserting and expanding an inner expandable mandrel within the composite tubular member to cause the inner expandable mandrel to press the composite tubular member against the inner surface of the tubular mandrel; curing the composite tubular member; removing the inner expandable mandrel; placing a frame within the composite tubular member; and removing the tubular mandrel so as to obtain the composite tubular member with the frame placed therein.

10 Claims, 11 Drawing Sheets

(51) Int. Cl.
  *B29C 70/32* (2006.01)
  *B29C 70/34* (2006.01)
  *B29C 70/38* (2006.01)
  *B29C 33/50* (2006.01)
  *B64C 1/14* (2006.01)
  *B64C 1/06* (2006.01)
  *B29C 65/02* (2006.01)
  *B29C 65/48* (2006.01)
  *B29C 65/56* (2006.01)
  *B29C 65/00* (2006.01)
  *B29L 31/30* (2006.01)
  *B29L 23/00* (2006.01)

(56) References Cited

U.S. PATENT DOCUMENTS

| 2005/0023414 A1 | 2/2005 | Braun |
| 2005/0039844 A1 | 2/2005 | Engwall et al. |
| 2006/0108058 A1 | 5/2006 | Chapman et al. |
| 2007/0210211 A1* | 9/2007 | Grob ................. B64C 1/061 244/119 |
| 2009/0230246 A1* | 9/2009 | Depeige ............. B64C 1/1492 244/129.3 |
| 2013/0337207 A1* | 12/2013 | Mueller ............. B29C 70/326 428/36.4 |

OTHER PUBLICATIONS

Airframe, Wikipedia, available at https://en.wikipedia.org/wiki/Airframe, accessed on Aug. 3, 2016.
Vickers Warwick, Wikipedia, available at https://en.wikipedia.org/wiki/Vickers_Warwick, accessed on Aug. 3, 2016.
Vickers Wellington(1), Wikipedia, available at https://en.wikipedia.org/wiki/Vickers_Wellington, accessed on Aug. 3, 2016.
Vickers Wellesley(2), Wikipedia, available at https://en.wikipedia.org/wiki/Vickers_Wellesley, accessed on Aug. 3, 2016.

* cited by examiner

TUBULAR STRUCTURE AND A METHOD OF MANUFACTURING THEREOF

FIELD

The present disclosure relates generally to a tubular structure and a method of manufacturing thereof.

BACKGROUND

Tubular structures have a wide variety of practical uses. Tubular structures are constructed by various methods and from various materials. Designers of such tubular structures satisfy certain design criteria (such as strength, stiffness, weight and torsional behavior) by varying material types (fibers/resins), orientations of fiber directions and geometric proportions of the tube itself. Another way designers have sought to improve high performance tubes is by developing new manufacturing techniques that can reduce cost and time of manufacturing such tubular structures.

Existing tubular structure may be fabricated by placing a tubular member horizontally. Prior to insertion of a frame within the tubular member to support it, the tubular member might not possess enough internal strength to support its weight. This can occur when the diameter of the tubular member is large relative to a thickness of the tubular member, e.g., when the tubular member is a fuselage of a commercial jet. Sagging, slumping, or changing the shape of the tubular member may thus occur as a result of the horizontal positioning. To alleviate this problem, additional bracing, jigs, and fixtures may be used to retain the shape of the tubular structure.

Further, the frame might not be fabricated until the tubular member is completed. In other words, the frame is fabricated in series with the tubular member. This may increase manufacturing time of the fuselage or any other tubular structure.

Therefore methods, processes, and structures are desired that allow for the frame to be fabricated in parallel with the tubular member to reduce overall manufacturing time and allow the tubular member to gain its structural integrity early in the fabrication process to reduce the use of bracing, jigs, and fixtures.

SUMMARY

The present disclosure describes embodiments that relate to a tubular structure and a method of manufacturing thereof. In one aspect, the present disclosure describes a method. The method comprises: (i) rotating a tubular mandrel about a longitudinal axis of the tubular mandrel, wherein the tubular mandrel is vertically-oriented; (ii) depositing a composite material on an inner surface of the tubular mandrel as the tubular mandrel is rotated so as to form a composite tubular member on the inner surface of the tubular mandrel; (iii) inserting an inner expandable mandrel within the composite tubular member; (iv) expanding the inner expandable mandrel so as to cause the inner expandable mandrel to press the composite tubular member against the inner surface of the tubular mandrel; (v) curing the composite tubular member while being sandwiched between the inner expandable mandrel and the tubular mandrel; (vi) removing the inner expandable mandrel; (vii) placing a frame within the composite tubular member; and (viii) removing the tubular mandrel so as to obtain the composite tubular member with the frame placed therein.

In another aspect, the present disclosure describes a tubular structure. The tubular structure comprises: (i) a composite tubular member; and (ii) a geodesic frame disposed within and contacting the composite tubular member, wherein the geodesic frame comprises two oppositely-wound spirals joined at intersection points of the two oppositely-wound spirals.

In still another aspect, the present disclosure describes a tubular structure prepared by a process comprising: (i) rotating a tubular mandrel about a longitudinal axis of the tubular mandrel, wherein the tubular mandrel is vertically-oriented; (ii) depositing a composite material on an inner surface of the tubular mandrel as the tubular mandrel is rotated so as to form a composite tubular member on the inner surface of the tubular mandrel; (iii) inserting an inner expandable mandrel within the composite tubular member; (iv) expanding the inner expandable mandrel so as to cause the inner expandable mandrel to press the composite tubular member against the inner surface of the tubular mandrel; (v) curing the composite tubular member while being sandwiched between the inner expandable mandrel and the tubular mandrel; (vi) removing the inner expandable mandrel; (vii) placing a frame within the composite tubular member; and (viii) removing the tubular mandrel so as to obtain the composite tubular member with the frame placed therein.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

In examples, a composite tubular structure may include a tubular member and a frame disposed within the tubular member to provide support for the tubular member. For instance, a fuselage of an aircraft may be made as a composite tubular structure that includes a skin and an internal frame to support the skin.

In an example, a method of fabricating the fuselage skin includes placing the fuselage horizontally. Further, prior to inserting the frame within the skin to support it, the fuselage is incomplete and unsupported and the skin supports its own weight against gravity. However, prior to inserting the frame within the frame, the skin might not possess enough internal strength to support its weight. Sagging, slumping, or changing the shape of the skin may thus occur as a result of the horizontal positioning and the lack of internal structural support for the skin. To alleviate this problem, additional bracing, jigs, and fixtures may be used to retain the shape of the skin.

Further, in this example, the frame of the fuselage is not fabricated until the skin "tube" is completed. In other words, the frame is fabricated in series with the skin, i.e., after the skin is fabricated. This may increase manufacturing time of the fuselage or any other tubular structure.

Disclosed herein are methods, processes, and structures that allows for the frame to be fabricated in parallel with the skin to reduce overall manufacturing time. Additionally, the disclosed methods and processes allow for the tubular member, e.g., the skin of the fuselage, to gain its structural integrity early in the fabrication process to reduce the use of bracing, jigs, and fixtures. Additionally, rather than using a complex series of frames and stringers to support the tubular member, disclosed herein is a geodesic frame that includes two oppositely-wound spirals that reduce the number of parts and cost of the frame.

II. EXAMPLE PROCESS FOR MANUFACTURING A TUBULAR STRUCTURE

As mentioned above, in fabricating tubular or barrel-shaped structures, gravity may change a shape of the structure or cause the structure to "slump." To preclude this slumping from happening, jigs, clamps, fixtures, shims, etc. may be employed, thus adding cost, complexity, and time to the manufacturing process. Alternatively, instead of orienting the tubular structure horizontally, the structure may be orientated vertically such that effect of gravity is reduced.

Figure 1:
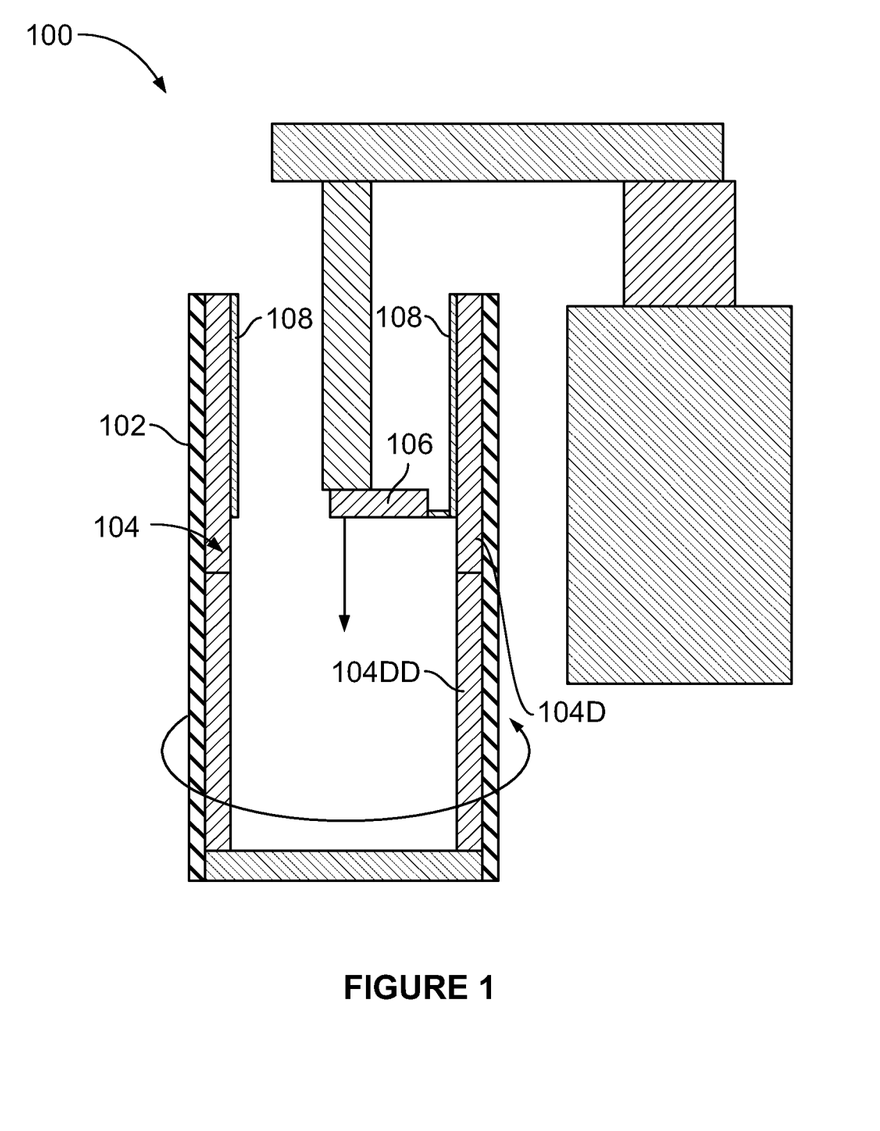
FIG. 1 illustrates an apparatus for fabricating a tubular member of a tubular structure in a vertical orientation, in accordance with an example implementation.

FIG. 1 illustrates an apparatus 100 for fabricating a tubular member of a tubular structure in a vertical orientation, in accordance with an example implementation. The apparatus 100 includes a vertical cylinder 102 configured to rotate about its own longitudinal axis. For instance a motor or engine may be coupled to the vertical cylinder 102 and configured to rotate it about its own longitudinal axis. The vertical cylinder 102 surrounds a vertically-oriented tubular mandrel 104. The tubular mandrel 104 is coupled to the vertical cylinder 102 and is thus configured to rotate therewith.

Figure 2:
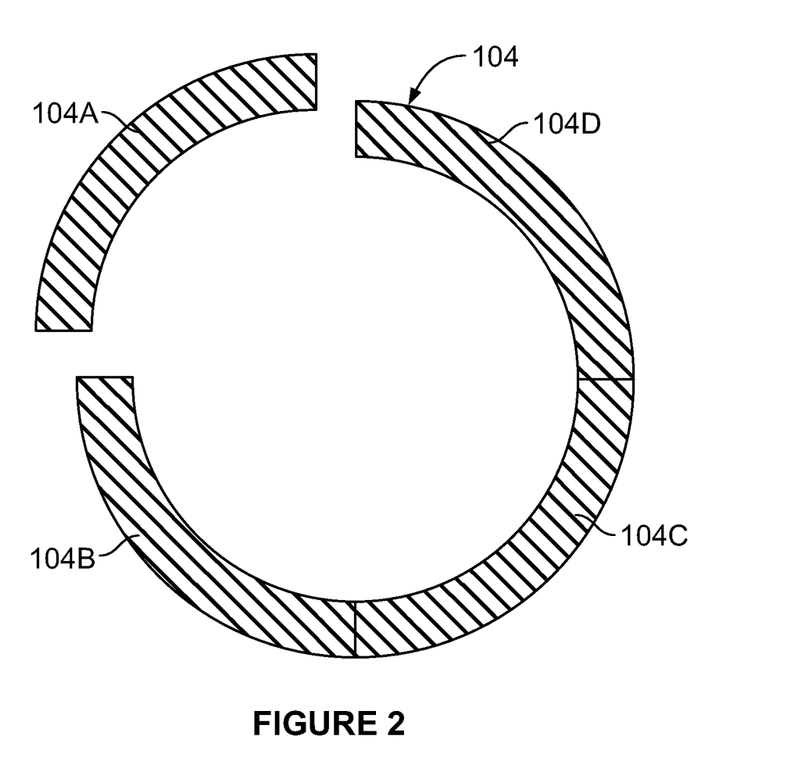
FIG. 2 illustrates a top view of a tubular mandrel, in accordance with an example implementation.

The tubular mandrel 104 may be segmented into arc segments. FIG. 2 illustrates a top view of the tubular mandrel 104, in accordance with an example implementation. As shown, the tubular mandrel 104 may include four arc segments 104A, 104B, 104C, and 104D of a tube. Each of these segments may operate as a forming plate. The segments 104A-D are interlocked to prevent formation of seams when a composite material is deposited on an inner surface of the tubular mandrel 104 as described below. Although FIG. 2 illustrates four segments. Any other number of segments could be used. For instance, two semi-circular halves could be used instead of the four arc segments 104A-D.

Further, the tubular mandrel 104 could also be segmented vertically based on a length of the tubular member being manufactured. For instance, if the tubular member is a fuselage section of an aircraft, the length of the fuselage section may determine how many vertical segments of the tubular mandrel 104 may be used. As shown in FIG. 1 as an example, instead of a single segment 104D, another vertical arc segment 104DD is used. The vertical segments 104D and 104DD are also interlocked. The other segments 104A-C could also have corresponding vertical arc segments.

In some examples described herein, a tubular member being manufactured is to be made of a composite material such as carbon fiber reinforced polymer (CFRP). The CFRP may, for example, include carbon fibered embedded with an epoxy material. However, other example materials could be used as well. Referring back to FIG. 1, a CFRP wrapping device (e.g., a robotic gantry device) 106 may be configured to reach into inner space of the tubular mandrel 104 and deposit CFRP material 108 on the inner surface of the tubular mandrel 104. In an example, the CFRP material 108 may take the form of a tape that is deposited on the inner surface of the tubular mandrel 104.

The device 106 is configured to move vertically up and down within the inner space of the tubular mandrel 104 while depositing the CFRP material 108 on the inner surface of the tubular mandrel 104. At the same time, the tubular mandrel 104 is rotating along with the vertical cylinder 102. The combination of rotation of the tubular mandrel 104 and vertical motion of the device 106 causes the device 106 to deposit the CFRP material 108 in a diagonal pattern. By varying vertical speed of the device 106 and rotational speed of the tubular mandrel 104, a desired diagonal orientation of the fiber can be achieved.

Figure 3:
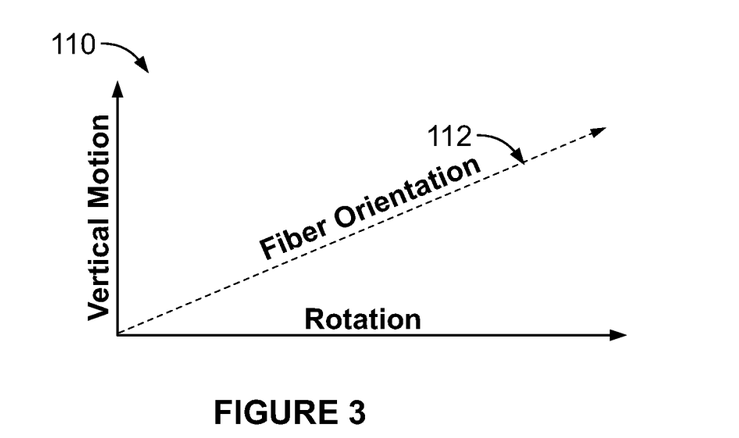
FIG. 3 illustrates diagonal orientation of deposited composite material, in accordance with an example implementation.

FIG. 3 illustrates diagonal orientation of deposited composite material, in accordance with an example implementation. As illustrated, the x-axis in a graph 110 represents rotation of the tubular mandrel 104, while the y-axis represents vertical motion of the device 106. Diagonal line 112 represents diagonal orientation of the CFRP material 108 being deposited. This diagonal orientation is also the diagonal orientation of the fiber embedded within the polymer of the CFRP material 108.

The carbon fiber embedded in the CFRP material 108 gives strength thereto. Particularly, the CFRP material 108 has higher strength along the direction of the carbon fiber embedded therein. Thus, by controlling diagonal orientation of the fiber by controlling the vertical motion of the device 106 and the rotational speed of the tubular mandrel 104, the fiber can be laid in the direction in which the strength of the CFRP material 108 is most desired.

Further, the device 106 may be moved vertically up and down to achieve multiple passes and increase a thickness of the resulting tubular member at given sections. For instance, if the tubular member is a section of a fuselage, it may be desired to increase strength around doors and windows of the aircraft. Thus, multiple passes may be performed by the device 106 for an area around a location of an aircraft door or window.

Further, the vertical speed of the device 106 may be changed based on which section of the tubular member is being formed. For instance, the device 106 may be slowed down to deposit more CFRP material 108 at a particular area of the tubular member and may be configured to perform multiple passes along that particular area to increase its strength.

In examples, other constraints may be placed on rotational speed of the tubular mandrel 104 so as to maintain integrity of the CFRP material 108 deposited on the inner surface of the tubular mandrel 104. The rotational speed determines a magnitude of a centripetal force that acts to maintain the CFRP material 108 attached to the inner surface of the tubular mandrel 104. If the centripetal force overcomes the effect of gravity of the CFRP material 108, the CFRP material 108 would maintain its integrity and attachment to the tubular mandrel 104.

In addition to rotational speed of the tubular mandrel 104, other factors that affect the integrity of the CFRP material 108 includes diameter of the tubular member being fabricated (i.e., the diameter of the inner surface of the tubular mandrel 104), weight of the CFRP material 108 (e.g., weight per linear inch), stickiness and adhesiveness of a previously-applied layer of the CFRP material 108. These factors in the aggregate may determine a net force that acts to hold the CFRP material 108 in place while the tubular mandrel 104 is spinning. If this net force is greater than the gravitational force tending to cause the CFRP material 108 to "droop," the CFRP material 108 may maintain its integrity and attachment to the inner surface of the tubular mandrel 104.

In an example, the device 106 may be allowed to "over-run" the ends of the tubular mandrel 104. In this manner, the resulting tubular member made of the CFRP material 108 may have "clean" ends, and "clean" entry and exit fiber placement.

During deposition of the CFRP material 108, rotation of the tubular mandrel 104 continues to maintain pressure on the CFRP material 108 against the inner surface of the tubular mandrel 104 due to the centripetal force resulting from the rotation. Otherwise, if the rotation is stopped, the CFRP material 108 may droop and lose its attachment to the tubular mandrel 104, because the CFRP material 108 is still uncured at this stage of the process. In order to extract the uncured tubular member formed by the CFRP material 108, an inner mandrel may be inserted within the tubular member made of the CFRP material 108 while the tubular mandrel 104 and the CFRP material 108 attached thereto are still rotating.

Figure 4:
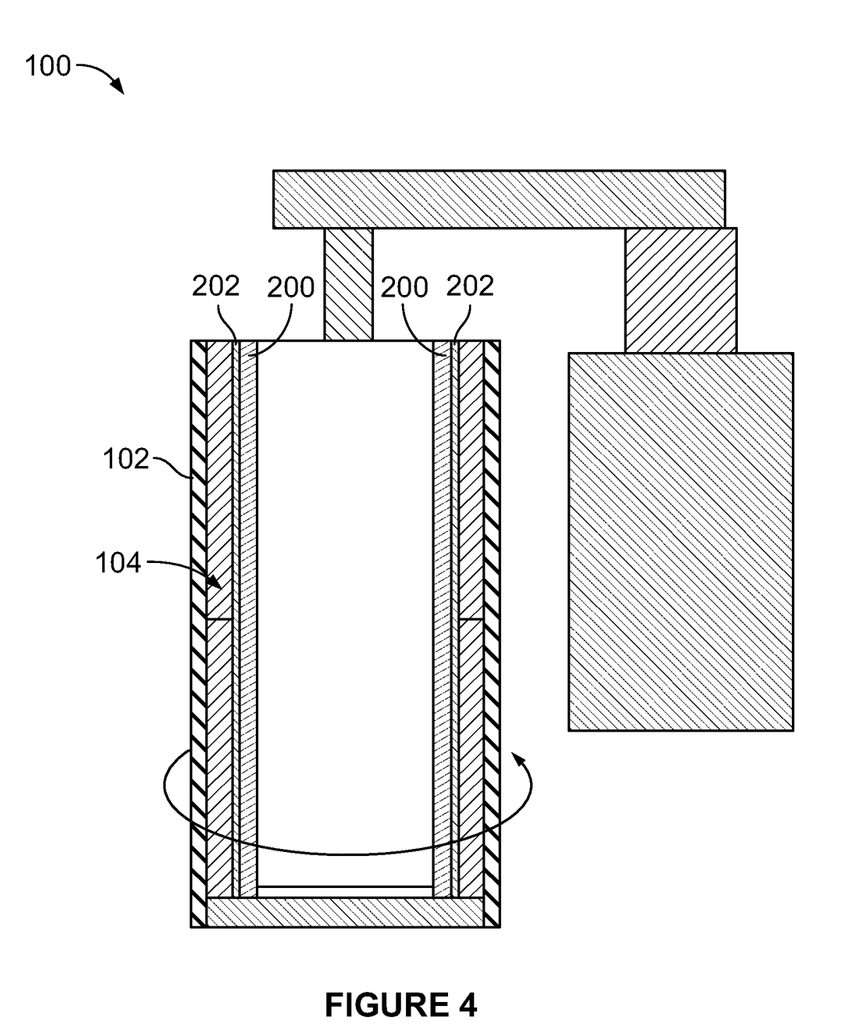
FIG. 4 illustrates an inner mandrel, in accordance with an example implementation.

FIG. 4 illustrates an inner mandrel 200, in accordance with an example implementation. In examples, the inner mandrel 200 may be an expandable mandrel. For instance, the inner mandrel 200 may include an inflatable bladder. Once the inner mandrel 200 is fully inserted within a tubular member 202 made of the CFRP material 108 shown in FIG. 1, the bladder may be inflated, e.g., by a gas or other fluid. The bladder is inflated until it reaches the inner surface of the tubular member 202 and applies a sufficient pressure to hold the CFRP material 108 of the tubular member 202 against the tubular mandrel 104.

The inner mandrel 200 may be rotated prior to reaching the inner surface of the tubular member 202. For instance, once fully inserted within the tubular member 202, the inner mandrel 200 may be rotated prior to expansion. Or, in another example, the inner mandrel 200 may be expanded and then prior to reaching the internal walls of the tubular member 202, the inner mandrel 200 may be rotated.

In examples, rotational speed of the inner mandrel 200 may be synchronized with the rotational speed of the tubular mandrel 104 and the tubular member 202 attached thereto. Thus, if the tubular mandrel 104 is rotating at a particular rotational speed, the inner mandrel 200 is also rotated to substantially the same rotational speed of the tubular mandrel 104, e.g., within a threshold rotations per minute, RPM, such as 5 RPM. In this manner, if the rotational speeds are synchronized, there is no relative speed between the inner mandrel 200 and the tubular member 202 attached to and rotating with the tubular mandrel 104. As such, when the inner mandrel 200 is expanded and reaches the inner wall of the tubular member 202, the inner mandrel 200 would not scratch or drag against the inner wall of the tubular member 202.

Once the inner mandrel 200 applies sufficient pressure on the tubular member 202, rotation of both the tubular mandrel 104 and the inner mandrel 200 and the tubular member 202 sandwiched therebetween may be stopped. Rotation is stopped by, for example, stopping rotation of the vertical cylinder 102 and stopping rotation of any component (e.g., a shaft) that causes the inner mandrel 200 to rotate.

Up to his point of the process, the tubular member 202 has been oriented vertically such that effect of gravity on its shape is reduced and no sagging might occur. The next step in the process might be curing the tubular member 202. In some examples, curing may be performed while the tubular member 202 is vertically-oriented. In other examples, orientation of the tubular member 202 may be changed prior to curing. Particularly, now that the tubular member 202 is sandwiched between the tubular mandrel 104 and the inner mandrel 200, integrity of the tubular member 202 is maintained, and its orientation could be changed to a horizontal orientation to facilitate curing.

Figure 5:
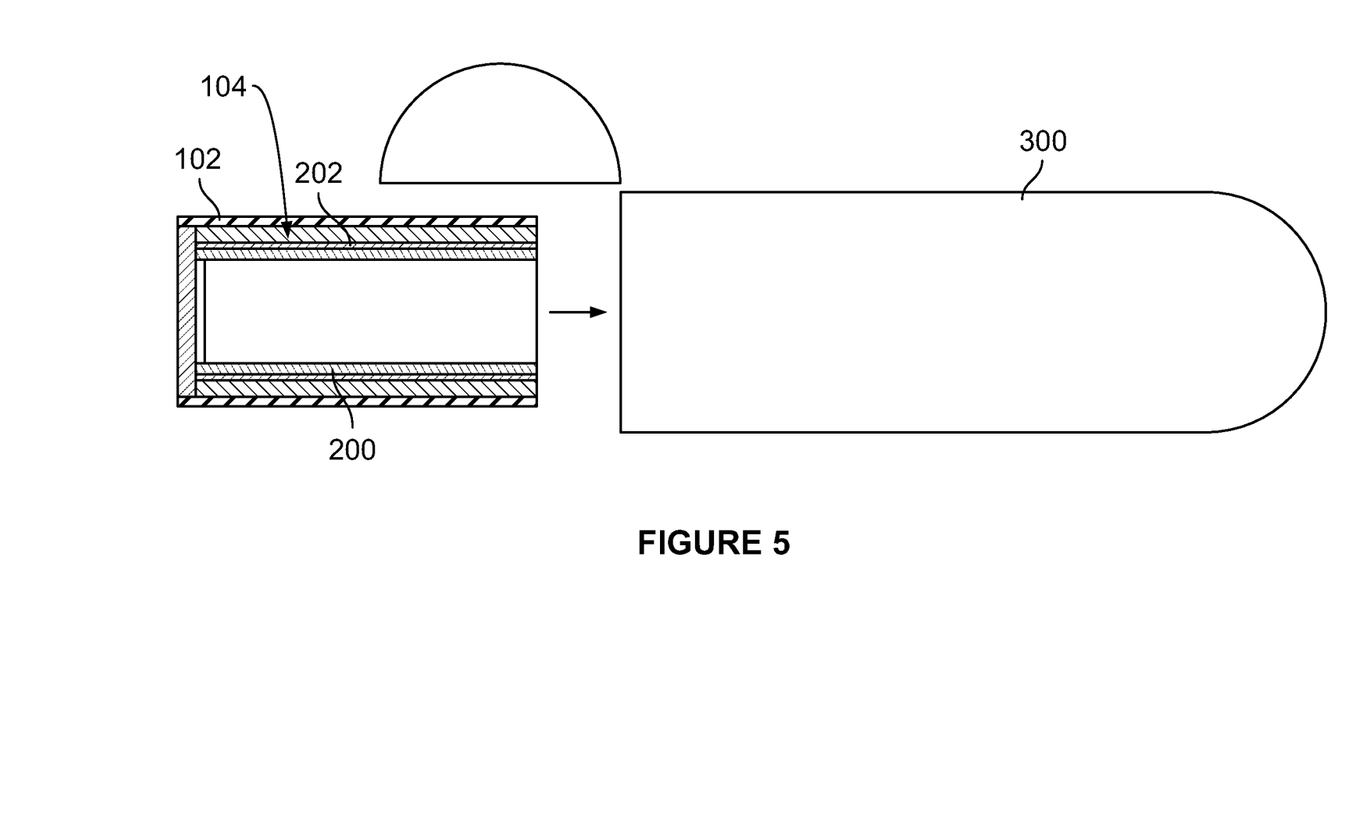
FIG. 5 illustrates curing a tubular member, in accordance with an example implementation.

FIG. 5 illustrates curing the tubular member 202, in accordance with an example implementation. In an example, the assembly including the tubular mandrel 104, the tubular member 202, and the inner mandrel 200 is removed from the vertical cylinder 102 and rotated to a horizontal position by a positioning device. The assembly may then be placed into an autoclave 300, as shown in FIG. 5, to be cured at a particular temperature for a predetermined amount of time. In another example, the vertical cylinder 102 along with the assembly may be inserted into the autoclave 300. In other words, the assembly including the tubular mandrel 104, the tubular member 202, and the inner mandrel 200 might not be removed from the vertical cylinder 102 prior to rotating the assembly to the horizontal position. Rather, the vertical cylinder 102 and the assembly are rotated to the horizontal position and inserted into the autoclave 300.

Other curing methods could be implemented. For instance, an out-of-autoclave curing process could be used. An example of such process is ambient curing. Other curing methods are possible as well.

After the curing process is completed, the assembly including the tubular mandrel 104, the tubular member 202, and the inner mandrel 200 is removed from the autoclave 300 and its temperature is allowed to stabilize. Next, the inflatable inner mandrel 200 is de-pressurized and removed. After removing the inner mandrel 200, the tubular member 202 could receive a frame therein.

If the frame is fabricated and assembled after the tubular member 202 is fabricated, manufacturing of the tubular structure is inefficient. However, if the frame can be fabricated independent from, and in parallel with, tubular member 202, manufacturing time and cost could be reduced. This parallel fabrication can be achieved by a geodesic frame. The geodesic frame may be composed of at least two oppositely-wound coils or spirals combined and fastened to make a strong, lightweight inner structure for the tubular member 202. In an example, if the tubular member 202 is a fuselage, the spirals could be made of titanium to achieve the desired strength and light weight.

Figure 6:
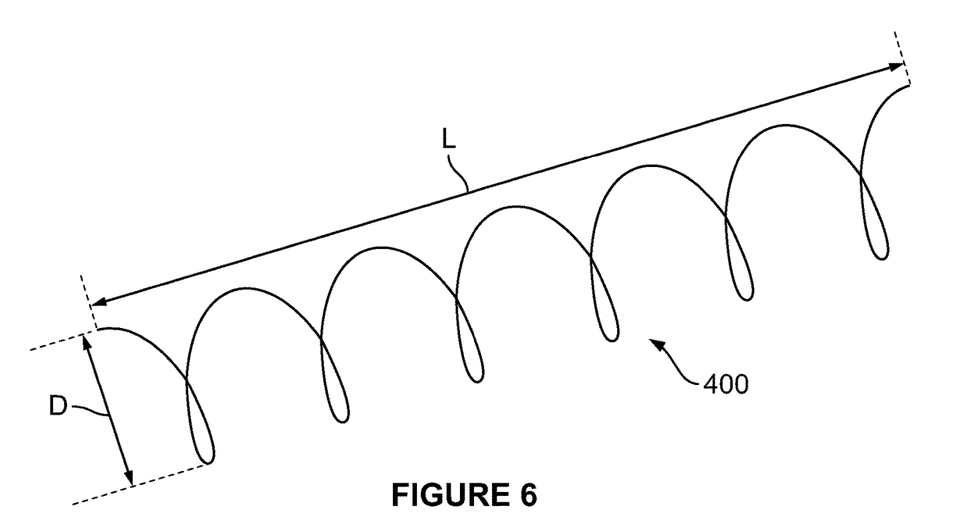
FIG. 6 illustrates a single spiral of a geodesic frame, in accordance with an example implementation.

FIG. 6 illustrates a single spiral 400 of a geodesic frame, in accordance with an example implementation. A length "L" of the spiral may be the length of the tubular member 202 and a diameter "D" of the spiral may be the inside diameter of the tubular member 202. Another spiral could be oppositely wound and coupled to the spiral 400. For instance, if the spiral 400 is wound in a clockwise direction, another spiral could be wound counter-clockwise and coupled to the spiral 400 to form a cage-like geodesic frame.

Figure 7:
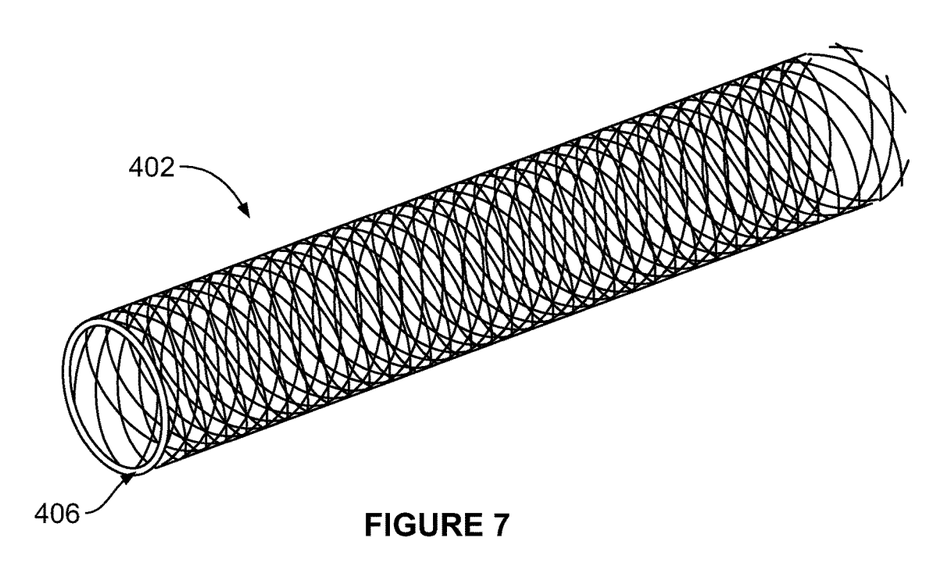
FIG. 7 illustrates a geodesic frame, in accordance with an example implementation.
Figure 8:
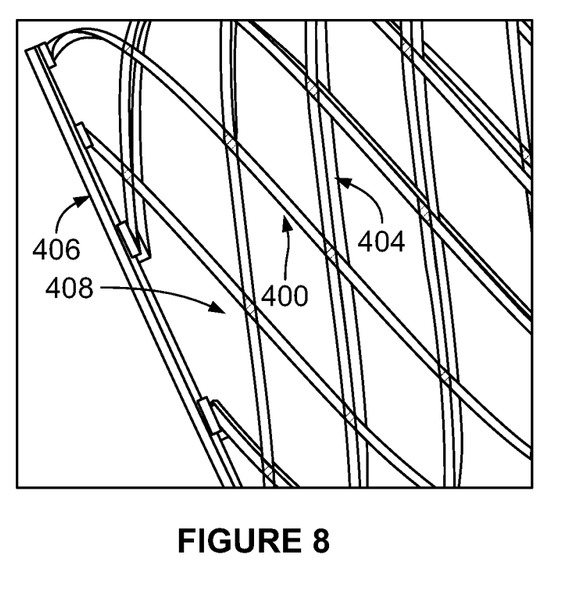
FIG. 8 illustrates a zoomed-in view of the geodesic frame shown in FIG. 7, in accordance with an example implementation.

FIG. 7 illustrates a geodesic frame 402, in accordance with an example implementation. The geodesic frame 402 includes the spiral 400 and another spiral oppositely wound with respect to the spiral 400. FIG. 8 illustrates a zoomed-in view of the geodesic frame 402, in accordance with an example implementation. As shown, the geodesic frame 402 includes a second spiral 404 oppositely wound with respect to the spiral 400. In examples, the geodesic frame 402 may include a greater number of spirals.

The portion shown in FIG. 8 is toward an end of the geodesic frame 402 and includes an end plate 406. The end plate 406 facilitates handling the geodesic frame 402 and may remain coupled to the spirals 400 and 404 after insertion into the tubular member 202 or may be removed.

The two oppositely-wound spirals 400 and 404 cross each other at multiple crossing or intersection points such as intersection point 408. In an example, the spirals 400 and 404 may be coupled to each other at the intersection points via fasteners or any kind of adhesive bonding. In another example, a separate coupling fitting could be attached at some or all of the intersection points to fasten the spiral 400 and 404 together. In still another example, one or both spirals 400 and 404 may have notches (e.g., V-shaped notches) that an opposite spiral may pass through. A tight fit may be created at the notches to couple the spirals 400 and 404 to each other. Additionally or alternatively, fasteners or adhesive could be used at the notch locations to couple the spirals 400 and 404 to each other.

In an example, the spirals 400 and 404 may have a cross section with a "U-shaped," "C-shaped," "L-shaped," "T-shaped," or "I-shaped" channel. For instance, the two spirals 400 and 404 may have two opposing "U-shaped" cross sections, and one spiral may fit within the other spiral at the crossing points. Alternatively, one spiral may pass underneath the other spiral and a fastener may be used to couple the two spirals as described below with respect to FIG. 15.

The arrangement of the spiral 400 and 404 of the geodesic frame 402 may create strong crossing joints and good structural rigidity can be attained. By varying the pitch and the number of coils of a spiral, the angularity or orientation of these joins can be varied.

Figure 9:
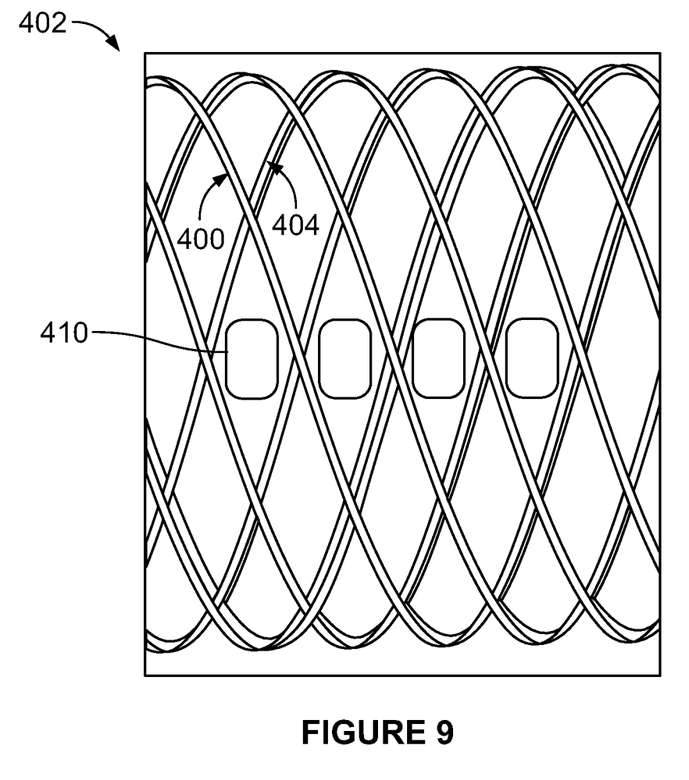
FIG. 9 illustrates a geodesic frame with aircraft windows, in accordance with an example implementation.

In an example where the tubular element 202 and the geodesic frame 402 pertain to a fuselage, orientation of the spirals 400 and 400 can be determined such that window placement is facilitated. FIG. 9 illustrates the geodesic frame 402 with aircraft windows, in accordance with an example implementation. As mentioned, the pitch and number of coils of the spirals 400 and 404 may be adjusted to create a space for windows such as window 410 of an aircraft.

Installation or insertion of the geodesic frame 402 into the tubular member 202 is described next.

Figure 10:
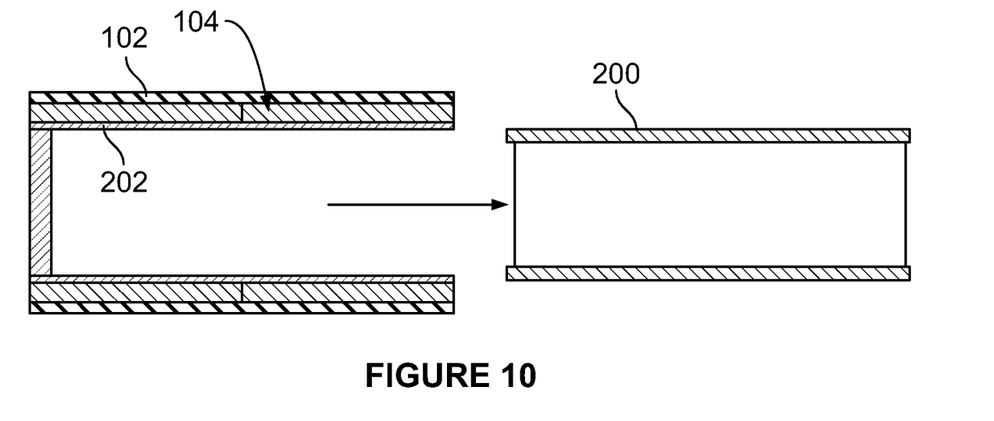
FIG. 10 illustrates removal of an inner mandrel, in accordance with an example implementation.

FIG. 10 illustrates removal of the inner mandrel 200, in accordance with an example implementation. As mentioned above, after the curing process is completed, the assembly including the tubular mandrel 104, the tubular member 202, and the inner mandrel 200 is removed from the autoclave 300 and its temperature is allowed to stabilize. Next, the inflatable inner mandrel 200 is de-pressurized and removed. The inner mandrel 200 can, for example, be pulled from the inner space of the tubular member 202 by way of a robotic arm or manipulator. The tubular mandrel 104 may be retained so as to maintain a circular or cylindrical shape of the tubular member 202. Meanwhile, the geodesic frame 402 may have been fabricated or assembled independently in parallel with fabrication of the tubular member 202.

Figure 11:
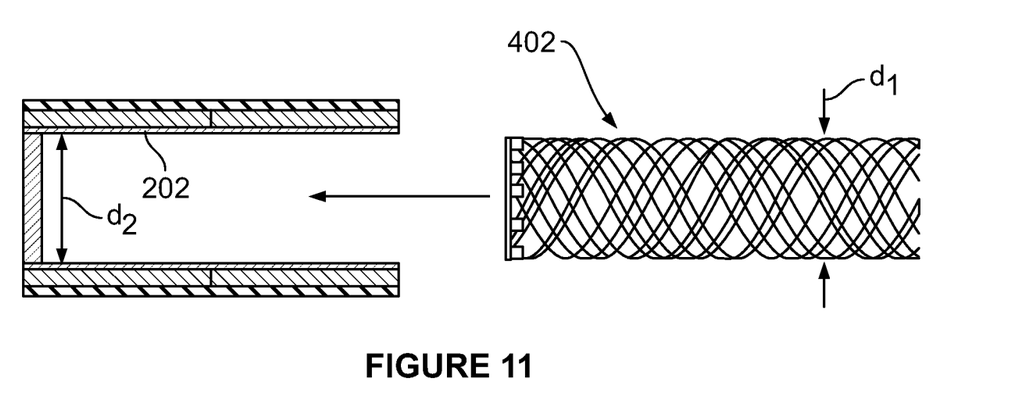
FIG. 11 illustrates a geodesic frame prior to insertion into a tubular member, in accordance with an example implementation.
Figure 12:
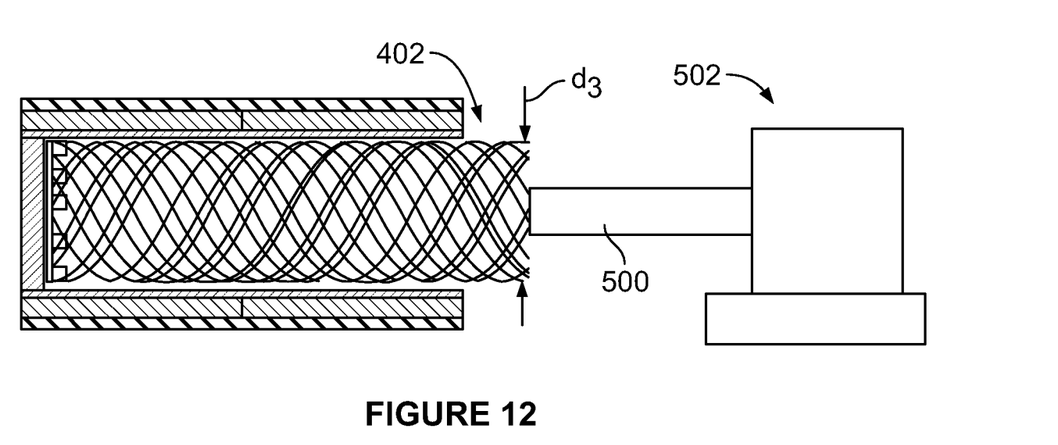
FIG. 12 illustrates insertion of a geodesic frame into a tubular member, in accordance with an example implementation.

FIG. 11 illustrates the geodesic frame 402 prior to insertion into the tubular member 202, and FIG. 12 illustrates insertion of the geodesic frame 402 into the tubular member 202, in accordance with an example implementation. As shown in FIG. 11, the geodesic frame 402 may have a diameter "$d_1$" and the tubular member 202 may have an inside diameter "$d_2$." These diameters may be substantially the same or the diameter "$d_1$" may be slightly larger than the diameter "$d_2$." In order to facilitate insertion of the geodesic frame 402 into the tubular member 202, the diameter "$d_1$" may be slightly decreased temporarily until the geodesic frame 402 is inserted.

As shown in FIG. 12, the geodesic frame 402 may be coupled to horizontal assembly mandrel 500, which could be a manipulator or an arm of a robotic device 502, for example. The robotic device 502 may be configured to slightly, axially stretch the geodesic frame 402 via the mandrel 500 so as to decrease the outside diameter "$d_1$" to a diameter "$d_3$," which is smaller than both "$d_1$" and "$d_2$." The mandrel 500 may then place the geodesic frame 402 into the tubular member 202.

Figure 13:
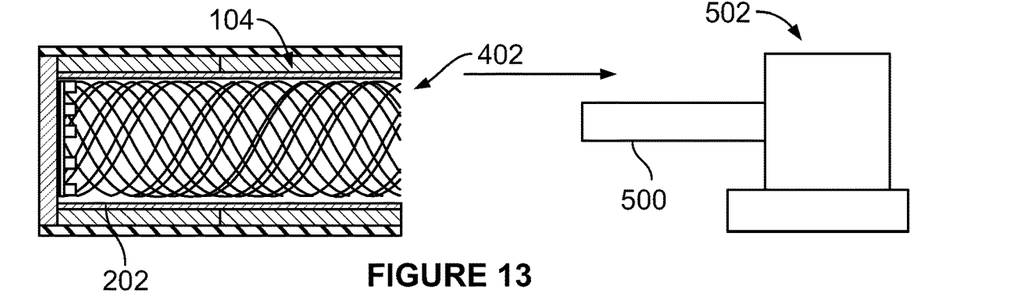
FIG. 13 illustrates a geodesic frame contacting a tubular member, in accordance with an example implementation.

FIG. 13 illustrates the geodesic frame 402 contacting the tubular member 202, in accordance with an example implementation. As shown in FIG. 13, the mandrel 500 may be slowly retracted, allowing the geodesic frame 402 to expand back to its un-stretched diameter "$d_1$." As a result of the expansion, the geodesic frame 402 contacts the inner surface of the tubular member 202, and thus supports the tubular member 202. In another example, the expansion of the geodesic frame 402 could also be accomplished by compressing it by the mandrel 500 to increase the outer diameter of the geodesic frame 402 and bring the geodesic frame 402 into contact with an inner surface of the tubular member 202.

In examples, the geodesic frame 402 may be pre-fastened to the tubular member 202 prior to extraction of the tubular member 202 and the geodesic frame 402 from the tubular mandrel 104. For example, fasteners could be drilled from the inside out to pre-fasten the geodesic frame 402 to the tubular member 202. In this example, the tubular mandrel 104 may include replaceable inserts at the locations where the fasteners are drilled to prevent the fasteners from breaking out through the tubular mandrel 104. These fasteners could later be replaced by countersunk "outside-in" fasteners.

In the examples where the tubular member 202 and the geodesic frame 402 represent a fuselage, windows and doors of the aircraft could be cut out and fitted at this stage of the manufacturing process. Edges of the tubular member 202 could then be trimmed and finished.

Figure 14:
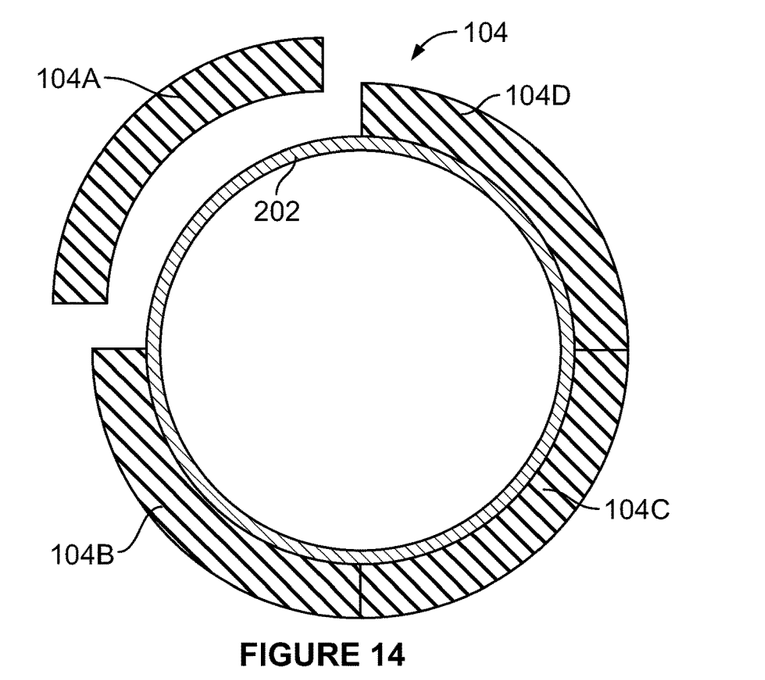
FIG. 14 extraction of a tubular structure, in accordance with an example implementation.

The tubular member 202 and the geodesic frame 402 disposed therein could then be extracted from the tubular mandrel 104. FIG. 14 illustrates extraction of a tubular structure, in accordance with an example implementation. FIG. 14 shows the tubular member 202 disposed within the tubular mandrel 104. The geodesic frame 402 is not shown to reduce visual clutter in the drawing. As mentioned above, the tubular mandrel 104 may include several interlocked arc segments such as the segments 104A-D. These segments could be disassembled from around the tubular member 202 as illustrated by removing the segments 104A in FIG. 14. The tubular member 202 and the geodesic frame 402 disposed therein could then be extracted.

Figure 15:
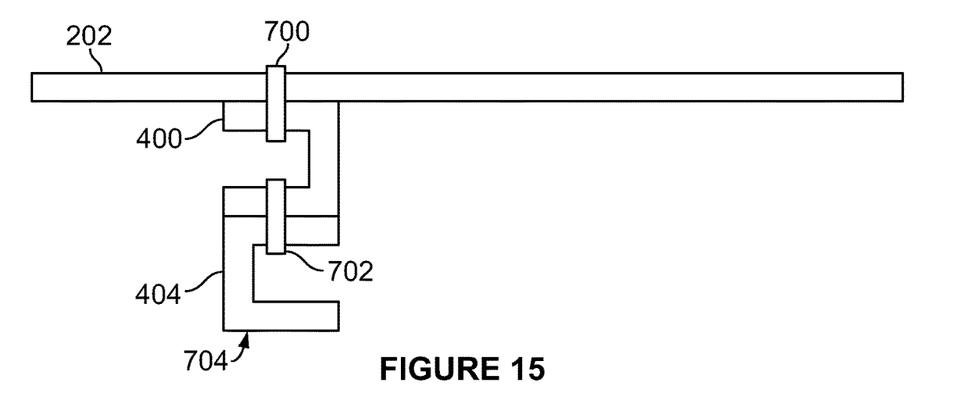
FIG. 15 illustrates fastening spirals of a geodesic frame to each other and fastening the geodesic frame to a tubular member, in accordance with an example implementation.

Permanent fasteners can be installed to couple the spirals 400 and 404 of the geodesic frame 402 to each other and couple the geodesic frame 402 to the tubular member 202. FIG. 15 illustrates fastening the spirals 400 and 404 of the geodesic frame 402 to each other and fastening the geodesic frame 402 to the tubular member 202, in accordance with an example implementation. As shown, a fastener 700 could be used to join an outside spiral, i.e., the spiral 400 in FIG. 15, of the geodesic frame 402 to the tubular member 202, which is made of composite material.

Similarly, another fastener 702 joins or couples the spirals 400 and 404 to each other. In the example of manufacturing a fuselage, the spirals 400 and 404 could be made of titanium (Ti). In this example, the fastener 702 is a Ti—Ti joint fastener. In FIG. 15, the spirals 400 and 404 are illustrated having "C," or "U" channel-shaped cross sections. Other cross sections could be used and the example shown is for illustration only.

The spirals 400 and 404 overlap each other in FIG. 15. However, other configurations are possible. For instance, the two opposing "C" or "U" channel-shaped cross sections may fit with each other instead of overlapping. Additional reinforcements could be added at the cross joints between the spirals 400 and 404 to increase integrity of the geodesic frame 402 and the resulting composite tubular structure that includes the tubular member 202 and the geodesic frame 402.

A secondary structure could be coupled to the geodesic frame 402. The secondary structure could, for example, contact a free inside surface 704 of the spiral 404.

Although the process described above illustrates using a geodesic frame including two oppositely-would spirals, other frame types could be used to support the tubular member 202.

Beneficially, the process described above allows for fabricating the geodesic frame 402 in parallel with the fabricating the tubular member 202 to reduce overall manufacturing time. Additionally, the process allows for the tubular member 202 to be vertically-oriented until it gains its structural integrity to reduce the use of bracing, jigs, and fixtures. Additionally, rather than using a complex series of frames and stringers to support the tubular member 202, the geodesic frame 402 described above reduces the number of parts and cost of the frame supporting the tubular member 202.

III. EXAMPLE METHODS

Figure 16:
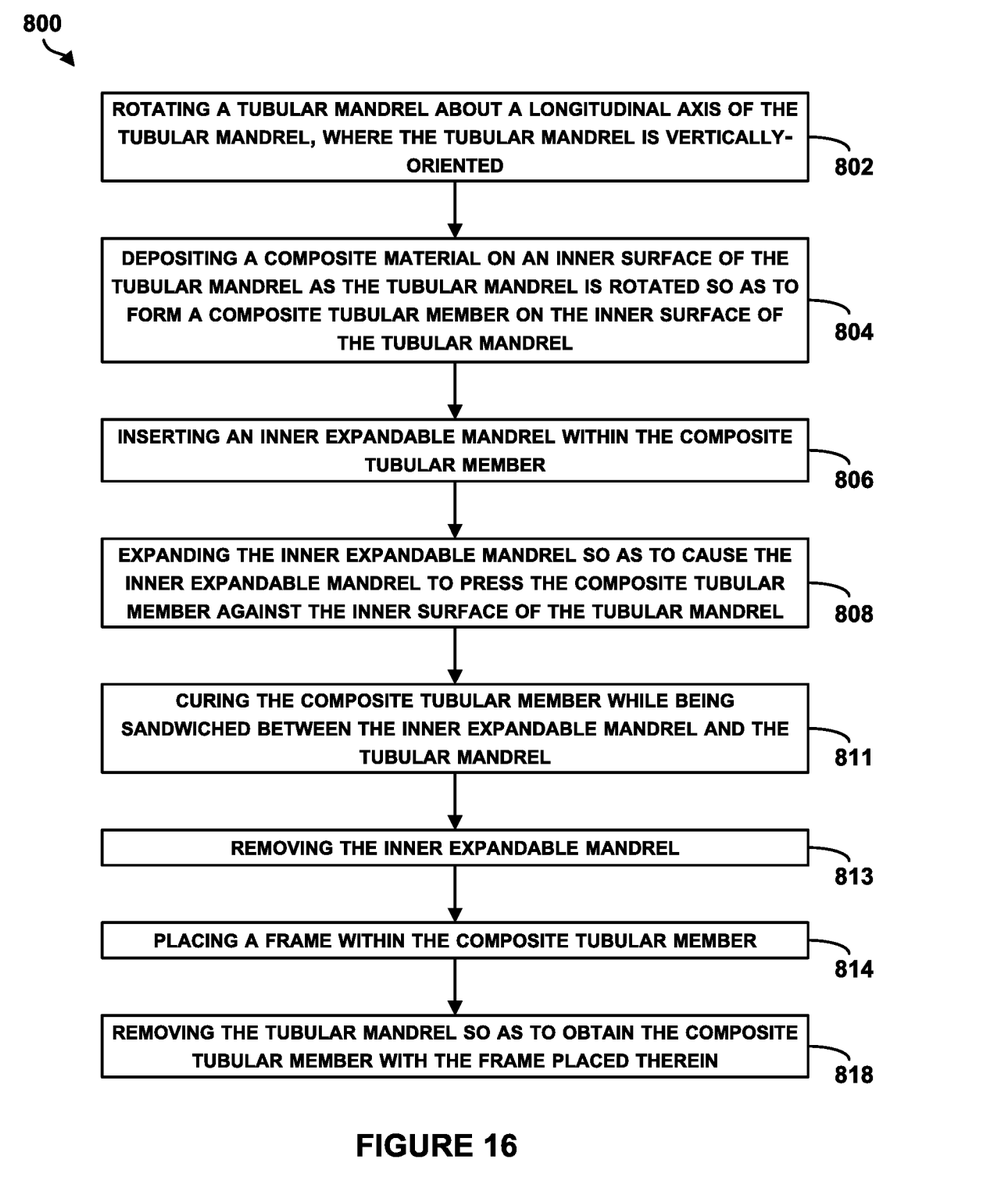
FIG. 16 is a flowchart of a method for manufacturing a tubular structure, in accordance with an example implementation.

FIG. 16 is a flowchart of a method 800 for manufacturing a tubular structure, in accordance with an example implementation. The method 800 represents a process that may be used, for example, to make or prepare the tubular structure including the tubular member 202 and the geodesic frame 402 as described above with respect to FIGS. 1-15. The method 800 may include one or more operations or actions as illustrated by one or more of blocks 802-818. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, the method 800 includes rotating a tubular mandrel about a longitudinal axis of the tubular mandrel, where the tubular mandrel is vertically-oriented. As described with respect to FIG. 1, a vertical cylinder (e.g., the vertical cylinder 102) may be configured to rotate about its own longitudinal axis. The vertical cylinder may surround a vertically-oriented tubular mandrel (e.g., the tubular mandrel 104). The tubular mandrel may include a plurality of interlocked arc segments of a tube (e.g., the segments 104A-D and 104DD). The tubular mandrel is coupled to the vertical cylinder and is thus configured to rotate therewith.

At block 804, the method 800 includes depositing a composite material on an inner surface of the tubular mandrel as the tubular mandrel is rotated so as to form a composite tubular member on the inner surface of the tubular mandrel. A CFRP wrapping device (e.g., a robotic gantry device such as the device 106) may be configured to reach into the inner space formed within the tubular mandrel and deposit CFRP material (e.g., the CFRP material 108) on an inner surface of the tubular mandrel.

Figure 17:
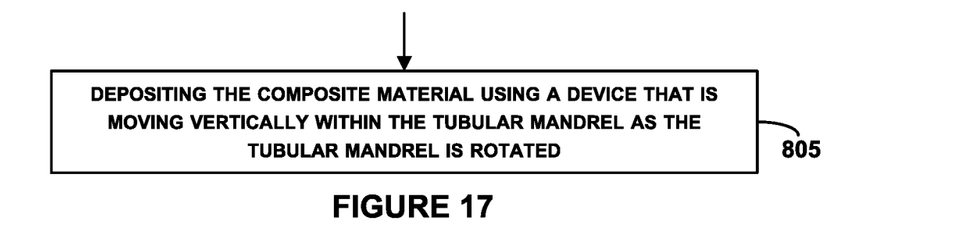
FIG. 17 is a flowchart of an example method for use with the method of FIG. 16, in accordance with an example implementation.

FIG. 17 is a flowchart of a method for use with the method 800, in accordance with an example implementation. At block 805, the method includes depositing the composite material using a CFRP wrapping device that is moving vertically within the tubular mandrel as the tubular mandrel is rotated. The combination of rotation of the tubular mandrel and vertical motion of the CFRP wrapping device causes the CFRP wrapping device to deposit the CFRP material in a diagonal pattern. By varying vertical speed of the device and rotational speed of the tubular mandrel, a desired diagonal orientation of the fiber can be achieved.

Referring back to FIG. 16, at block 806, the method 800 includes inserting an inner expandable mandrel within the composite tubular member. As described with respect to FIG. 4, an inner mandrel (e.g., the inner mandrel 200) may be an expandable mandrel. For instance, the inner mandrel may include an inflatable outer bladder. The inner expandable mandrel may be inserted within the tubular member in a deflated state to facilitate the insertion.

At block 808, the method 800 includes expanding the inner expandable mandrel so as to cause the inner expandable mandrel to press the composite tubular member against the inner surface of the tubular mandrel. Once the inner mandrel is fully inserted within a tubular member made of the CFRP material, the method 800 includes expanding the inner expandable mandrel.

Figure 18:
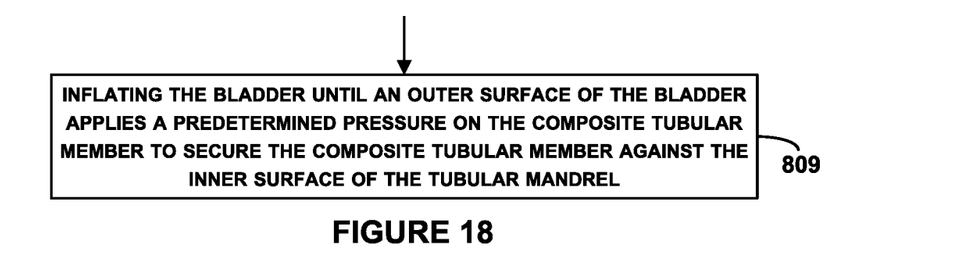
FIG. 18 is a flowchart of an example method for use with the method of FIG. 16, in accordance with an example implementation.

FIG. 18 is a flowchart of a method for use with the method 800, in accordance with an example implementation. In the example where the inner mandrel includes a bladder, at block 809, the method includes inflating the bladder until an outer surface of the bladder reaches the inner surface of the tubular member and applies a sufficient predetermined pressure (e.g., 100 pounds per square inch (psi), or within a range of about 50-250 psi in other examples) to hold or secure the CFRP material of the tubular member against the inner surface of the tubular mandrel.

The inner mandrel may be rotated prior to reaching the inner surface of the tubular member. For instance, once fully inserted within the tubular member, the inner mandrel may be rotated prior to expansion. Or, in another example, the inner mandrel may be expanded and then prior to reaching the internal walls of the tubular member, the inner mandrel may be rotated.

In examples, rotational speed of the inner mandrel may be synchronized with the rotational speed of the tubular mandrel and the tubular member attached thereto. In other words, if the tubular mandrel is rotating at a particular rotational speed, the inner mandrel is also rotated to substantially the same rotational speed of the tubular mandrel.

Figure 19:
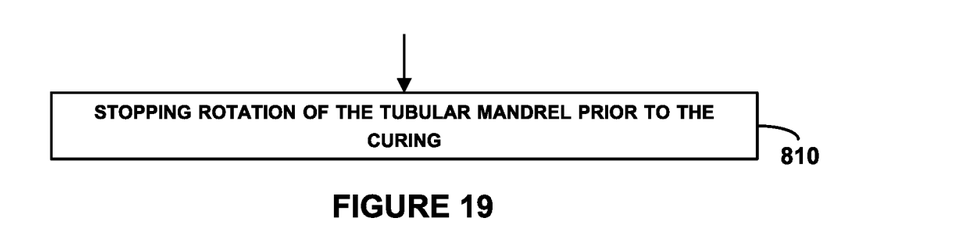
FIG. 19 is a flowchart of an example method for use with the method of FIG. 16, in accordance with an example implementation.

FIG. 19 is a flowchart of an example method for use with the method 800, in accordance with an example implementation. Once the inner mandrel applies sufficient pressure on the tubular member, at block 810, the method includes stopping rotation of the tubular mandrel, the inner mandrel, and the tubular member sandwiched therebetween.

Referring back to FIG. 16, at block 811, the method 800 includes curing the composite tubular member while being sandwiched between the inner expandable mandrel and the tubular mandrel. In an example, the assembly including the tubular mandrel, the tubular member, and the inner mandrel is removed from the vertical cylinder.

Figure 20:
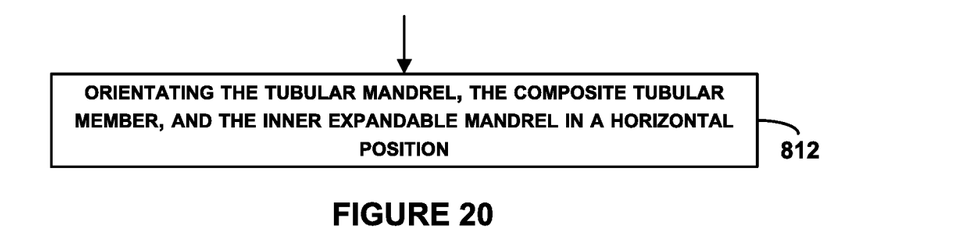
FIG. 20 is a flowchart of an example method for use with the method of FIG. 16, in accordance with an example implementation.

FIG. 20 is a flowchart of an example method for use with the method 800, in accordance with an example implementation. At block 812, the method includes orientating the tubular mandrel, the tubular member, and the inner expandable mandrel in a horizontal position, prior to the curing, by a positioning device as described with respect to FIG. 5. The assembly may then be placed into an autoclave to be cured at a particular temperature for a predetermined amount of time (e.g., an hour). In another example, the vertical cylinder along with the assembly is inserted into the autoclave.

Other curing methods could be implemented. For instance, an out-of-autoclave curing process could be used. An example of such process is ambient curing. Other curing methods are possible as well.

Referring back to FIG. 16, at block 813, the method 800 includes removing the inner expandable mandrel. After the curing process is completed, the assembly including the tubular mandrel, the tubular member, and the inner mandrel is removed from the autoclave and its temperature is allowed to stabilize. Next, the inflatable inner mandrel may be depressurized or deflated and removed. After removing the inner mandrel, the tubular member could receive a frame therein.

At block 814, the method 800 includes placing a frame within the composite tubular member. The frame can be fabricated independent from and in parallel with tubular member so as to reduce manufacturing time and cost. Any type of supporting frame could be used. As an example, the frame could be a geodesic frame such as the geodesic frame 402 described above. The geodesic frame may be composed of at least two oppositely-wound spirals combined and joined at intersection points of the two oppositely-wound spirals to make a strong, lightweight inner supporting structure for the tubular member.

Figure 21:
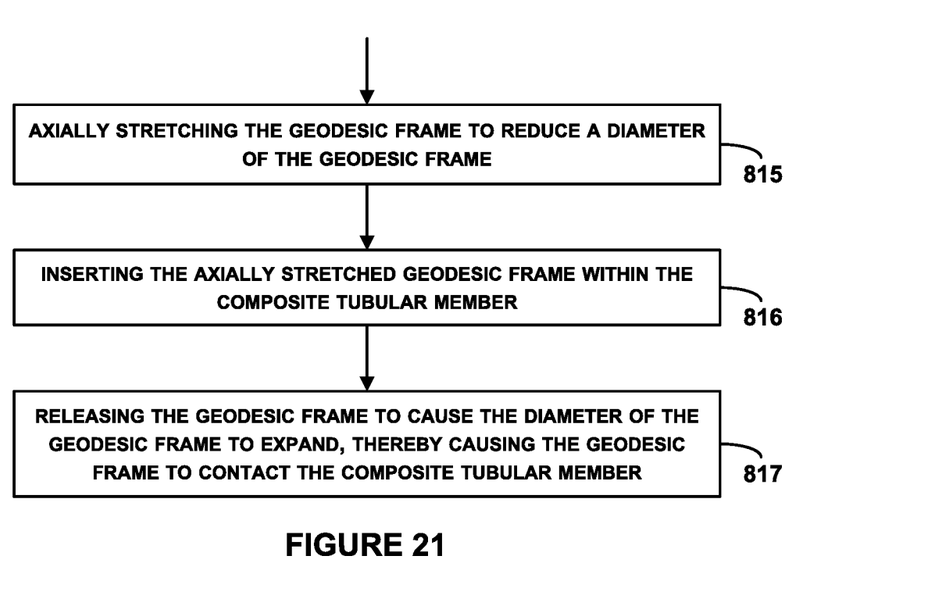
FIG. 21 is a flowchart of an example method for use with the method of FIG. 16, in accordance with an example implementation.

FIG. 21 is a flowchart of an example method for use with the method 800, in accordance with an example implementation. In order to facilitate insertion of the geodesic frame, or any other frame, into the tubular member, at block 815, the method includes axially stretching the geodesic frame to reduce a diameter of the geodesic frame. At block 816, the method 800 then includes inserting the axially stretched geodesic frame within the composite tubular member. At block 817, the method further includes releasing the geodesic frame to cause the diameter of the geodesic frame to expand, thereby causing the geodesic frame to contact and support the composite tubular member.

Referring back to FIG. 16, at block 818, the method 800 includes removing the tubular mandrel so as to obtain the composite tubular member with the frame placed therein. The tubular member and the frame disposed therein could be extracted from the tubular mandrel by, for example, disassembling arc segments of the tubular mandrel as described with respect to FIG. 14. The tubular member and the frame disposed therein could then be extracted. In this manner, a composite tubular structure that includes the tubular member and the frame disposed therein is obtained.

IV. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A tubular structure comprising:
    a composite tubular member, wherein the composite tubular member includes one or more sections having an increased thickness compared to other sections of the composite tubular member;
    a geodesic frame disposed within and contacting the composite tubular member, wherein the geodesic frame comprises two oppositely-wound spirals joined at intersection points of the two oppositely-wound spirals, wherein pitch and number of coils of the two oppositely-wound spirals cause the geodesic frame to have space for windows to be formed at the one or more sections having the increased thickness; and
    an end plate coupled to respective ends of the two oppositely-wound spirals.

2. The tubular structure of claim 1, wherein the geodesic frame is coupled to the composite tubular member using a plurality of fasteners or adhesive bonding.

3. The tubular structure of claim 1, wherein at least one of the two oppositely-wound spirals of the geodesic frame has a U-shaped, L-shaped, T-shaped, or I-shaped cross section.

4. The tubular structure of claim 1, wherein the two oppositely-wound spirals are joined at the intersection points of the two oppositely-wound spirals using a plurality of fasteners or adhesive bonding.

5. The tubular structure of claim 1, wherein at least one of the two oppositely-wound spirals of the geodesic frame has a plurality of notches at the intersection points of the two oppositely-wound spirals to facilitate joining the two oppositely-wound spirals.

6. The tubular structure of claim 1, wherein the tubular structure comprises at least a section of a fuselage.

7. A tubular structure prepared by a process comprising:
    rotating a tubular mandrel about a longitudinal axis of the tubular mandrel, wherein the tubular mandrel is vertically-oriented;
    depositing a composite material on an inner surface of the tubular mandrel as the tubular mandrel is rotated so as to form a composite tubular member on the inner surface of the tubular mandrel, wherein the composite tubular member includes one or more sections having an increased thickness compared to other sections of the composite tubular member;
    inserting an inner expandable mandrel within the composite tubular member;
    expanding the inner expandable mandrel so as to cause the inner expandable mandrel to press the composite tubular member against the inner surface of the tubular mandrel;
    curing the composite tubular member while being sandwiched between the inner expandable mandrel and the tubular mandrel;
    removing the inner expandable mandrel;
    inserting a frame within the composite tubular member, wherein the frame is a geodesic frame comprising two oppositely-wound spirals joined at intersection points of the two oppositely-wound spirals, and wherein pitch and number of coils of the two oppositely-wound spirals cause the geodesic frame to have space for windows to be formed at the one or more sections having the increased thickness, wherein the tubular structure further comprises an end plate coupled to respective ends of the two oppositely-wound spirals; and
    removing the tubular mandrel so as to obtain the composite tubular member with the frame placed therein.

8. The tubular structure of claim 7, wherein inserting the frame within the composite tubular member comprises:
    axially stretching the geodesic frame to reduce a diameter of the geodesic frame;
    inserting the axially stretched geodesic frame within the composite tubular member; and
    releasing the geodesic frame to cause the diameter of the geodesic frame to expand, thereby causing the geodesic frame to contact the composite tubular member.

9. The tubular structure of claim 7, wherein the process further comprises:
    orientating the tubular mandrel, the composite tubular member, and the inner expandable mandrel in a horizontal position prior to the curing.

10. The tubular structure of claim 7, wherein depositing the composite material on the inner surface of the tubular mandrel comprises:
    depositing the composite material using a device that is moving vertically within the tubular mandrel as the tubular mandrel is rotated.

* * * * *